(12) United States Patent
Eppler

(10) Patent No.: US 11,117,235 B2
(45) Date of Patent: Sep. 14, 2021

(54) MACHINE TOOL

(71) Applicant: CHIRON-WERKE GmbH & Co. KG, Tuttlingen (DE)

(72) Inventor: Claus Eppler, Messstetten (DE)

(73) Assignee: CHIRON-WERKE GmbH & Co. KG, Tuttlingen (DE)

( * ) Notice: Subject to any disclaimer, the term of this patent is extended or adjusted under 35 U.S.C. 154(b) by 0 days.

(21) Appl. No.: 16/529,080

(22) Filed: Aug. 1, 2019

(65) Prior Publication Data

US 2019/0351521 A1 Nov. 21, 2019

Related U.S. Application Data

(63) Continuation of application No. PCT/EP2018/051887, filed on Jan. 25, 2018.

(30) Foreign Application Priority Data

Feb. 7, 2017 (DE) ..................... 10 2017 102 379.8

(51) Int. Cl.
*B23Q 16/00* (2006.01)
(52) U.S. Cl.
CPC .................. *B23Q 16/006* (2013.01)
(58) Field of Classification Search
CPC .................................................. B23Q 16/006
See application file for complete search history.

(56) References Cited

U.S. PATENT DOCUMENTS

| | | | |
|---|---|---|---|
| 4,317,395 A | 3/1982 | Castano | |
| 4,694,939 A | 9/1987 | Heideman et al. | |
| 5,188,018 A | 2/1993 | Trenner | |
| 5,559,413 A * | 9/1996 | Seto | G05B 19/231 318/568.18 |
| 5,581,220 A | 12/1996 | Rodenbush et al. | |
| 6,116,104 A | 9/2000 | Nagai et al. | |
| 6,371,460 B1 | 4/2002 | Orihara | |
| 7,275,468 B2 * | 10/2007 | Montesanti | B23B 29/04 82/1.11 |

(Continued)

FOREIGN PATENT DOCUMENTS

| | | |
|---|---|---|
| DE | 7926126 U1 | 1/1980 |
| DE | 7926847 U1 | 1/1980 |
| DE | 2918641 A | 11/1980 |

(Continued)

OTHER PUBLICATIONS

International Search Report for International Application No. PCT/EP2018/051887, dated May 7, 2018.

(Continued)

*Primary Examiner* — Alan Snyder

(74) *Attorney, Agent, or Firm* — Jason H. Vick; Sheridan Ross, PC

(57) ABSTRACT

A machine tool for machining workpieces has a machine frame, at least one component part which can be moved along a movement path by means of a power-operated drive unit, at least one frame part, which is connected to the machine frame and which is arranged at an end position in the movement path of the component part, and at least a first stop, via which the component part in contact with the frame part when said component part is in the end position, wherein the first stop lies outside the movement path.

27 Claims, 6 Drawing Sheets

(56) References Cited

U.S. PATENT DOCUMENTS

2002/0038601 A1    4/2002  Hoogen

FOREIGN PATENT DOCUMENTS

| | | |
|---|---|---|
| DE | 29908563 U1 | 10/1999 |
| DE | 19930434 A1 | 1/2000 |
| DE | 10050617 A1 | 6/2001 |
| DE | 102010049677 A | 3/2012 |
| EP | 0472778 A2 | 3/1992 |
| JP | S59-196152 A | 11/1984 |

OTHER PUBLICATIONS

Written Opinion for International Application No. PCT/EP2018/051887, dated May 7, 2018.
Examination Report for German Patent Application No. 10 2017 102 379.8, dated May 14, 2019.
International Preliminary Report on Patentability for International Application No. PCT/EP2018/051887, dated Aug. 22, 2019.

* cited by examiner

MACHINE TOOL

RELATED APPLICATION

This is a continuation application of co-pending international patent application PCT/EP2018/051887, filed Jan. 25, 2018 and designating the United States, which was published in German as WO 2018/145914 A1, and claims priority to German patent application DE 10 2017 102 379.8, filed Feb. 7, 2017, each of which are incorporated herein by reference.

BACKGROUND OF THE INVENTION

Field of the Invention

The present invention relates to a machine, preferably a machine tool for machining workpieces, wherein the machine has a machine frame, at least one component part which can be moved along a movement path by means of a power-operated drive unit, at least one frame part, which is connected to the machine frame and which is arranged at an end position in the movement path of the component part, and at least two stops, which are situated between the component part and the frame part, at least when the component part is in the end position.

Related Prior Art

Machines of this kind are sufficiently well known from the prior art.

The machines can be designed as machine tools or, alternatively, can serve as assembly devices, handling devices for loading and unloading workpieces, workpiece pallets or tools and can be associated with the machine tools, for example. These machines can be designed as portal machines, on which a motor-driven, vertically aligned ballscrew is provided as a drive unit, said screw moving a gripping or transfer device as a component part in a vertical direction, wherein the gripping or transfer device is traversed in the horizontal plane by means of a portal.

Machine tools of this kind are designed as portal machines or as traveling column machines, on which a tool spindle is provided which has a chuck for machining tools at its lower or front end. The tool spindle is mounted, for example, in a spindle head, which is mounted in a vertically adjustable manner on a traveling column or portal.

A traveling column, in turn, is mounted in such a way as to be traversable in a horizontal direction on a cross piece, which, in turn, is arranged on the machine frame in such a way as to be traversable in a second horizontal direction.

A work table, on which workpieces to be machined are clamped, is furthermore arranged on the machine frame in a workspace below the tool spindle.

In this way, a machining tool gripped in the chuck of the tool spindle can be traversed in three orthogonal directions relative to the workpiece in order to carry out conventional machining processes such as milling, drilling, thread cutting etc.

In the other machine tools, not all of the three orthogonal axes, which are usually referred to as the x, y and z axes, are arranged in the machining tool; instead, at least one axis is shifted into the workpiece, thus enabling the workpiece to be traversed in the x and/or y direction, for example, relative to the tool spindle, which is then only traversed along the vertical z axis and possibly along one horizontal axis.

In the case of machine tools, it is also customary to mount the tool spindle in horizontal alignment on a compound slide, rather than vertically.

To traverse the spindle head on the traveling column and to traverse the traveling column relative to the cross piece and to traverse the cross piece relative to the machine frame, use is made of drive units, which generally have linear direct drives with balance weights or ball screws, which are driven by means of a motor, generally an electric or stepping motor. Drive units of this kind are also used in other machines that form the subject matter of the present invention.

In general, the ball screw is connected to a motor hub of the motor via a coupling, wherein this coupling is of extremely torsionally rigid design to enable the rotary steps of the motor to be converted into the feed motion of the spindle nut without play.

Seated on the ball screw is a spindle nut, which is traversed along the ball screw in one or the other direction as the ball screw rotates. The ball screw is generally assigned a glass scale, which monitors the adjustment of the spindle nut by measurement and reports to a machine controller, which in each case drives the motor in such a way, that is to say in particular causes a corresponding number of revolutions to be performed, that the spindle nut adopts a predetermined position on the ball screw.

In general, the motor is a stepping motor, which can be controlled accurately in terms of position, as a result of which the respective position of the spindle nut is known precisely from the angle of rotation of the stepping motor and the pitch of the ball screw and can be specified. The glass scale is then used to monitor whether the spindle nut has in fact adopted the predetermined position.

The cross slide, the traveling column, the spindle head or a comparable component part are then connected to the spindle nut, ensuring that, when the spindle nut is traversed along the ball screw, the respective component part is traversed parallel to the ball screw.

As a further component part moved by means of a drive unit of this kind, mention may be made, for example, of a feed element, by means of which workpieces are positioned in the workspace.

Other drive units serve to rotate component parts of the machine tools, as is the case, for example, with a turntable or a pivotable cradle device, which can carry a workpiece clamping device, a workpiece spindle or a tool spindle and pivot them about an axis.

The drive units can be actuated electrically, hydraulically or pneumatically and are therefore power-operated.

All machines of this kind have a machine frame on which the power-operated drive unit is mounted and the component part is suitably guided, thus enabling it to be moved, i.e. traversed or rotated, along the movement path. By virtue of the design or for safety reasons, the component parts are generally moved between two end positions, at which frame parts are arranged in a fixed manner in the movement path or are moved into the movement path when required.

These frame parts thus counteract a movement of the component part beyond the end position. Arranged between the frame part and the component part there is in general at least one stop, which serves as a kind of buffer in order to damp the impact of the component part on the frame part or to ensure a safety clearance between the component part and the frame part.

The present invention can be employed on all machine tools of this kind and with other machines, such as the handling devices and assembly devices mentioned at the outset, on which component parts such as spindle heads, turntables, cradles, grippers or other components can be traversed along a movement path which is linear, circular or curved in some other way by means of a power-operated drive unit.

During the operation of such machines, there are repeatedly situations in which machine parts, i.e. components of the drive unit or guides of the component parts or construction elements of the component parts, lose their strength and/or stiffness due to wear, material fatigue or material defects, which may lead to accuracy problems in the operation of the machine and even breakage or separation of certain components and associated safety problems.

Such breakage or separation is particularly problematic in the case of vertically extending drive units, e.g. in the case of ball screws or linear direct drives, because this represents a risk potential if the operator of the machine or the service or maintenance personnel must be given access to the shaft.

However, such breakage or separation can also represent a problem in the case of horizontally traversing component parts because namely a component part which may have just been accelerated then continues to move without braking and without the possibility of braking, which not only represents a risk potential for operating personnel but also harbors the risk that components of the machine tool will be damaged. This is the case especially if the component parts moved by means of the drive unit have high masses which are moved with high acceleration, as is the case with a view to rapid machining, assembly or loading of the workpieces on all the machines mentioned.

However, one particular risk for the operating personnel exists with vertical drive units, which move component parts such as the spindle head vertically.

If the drive unit is a ball screw drive, there is not only the risk of breakage of the coupling, causing the ball screw as it were to lose contact with the motor hub, but also an additional risk potential if the ball screw itself breaks. In both cases, the motor is no longer capable of braking the ball screw, and therefore there is the risk in continuous operation that the moving component parts will lead to serious damage to the machine since they cannot be braked at the right time.

In the case of vertically traversing component parts, that is to say, for example, in the case of the spindle head, breakage of the ball screw is a serious risk for the operating personnel even when stationary. If the ball screw breaks during setup or service work, the spindle head is often no longer held and can move downward unhindered, causing injury as it does so to people operating in the workspace.

To master these problems, the component parts are held by means of the energized motor when the machine is switched on, whereas the drive unit is held fast by means of a brake provided in the region of the motor when the motor is switched off.

However, if the coupling or the ball screw breaks, neither an energized motor nor the brake can prevent random traversing of the component parts.

Failure of the brake is counteracted by regular checking of the brake, e.g. by testing it cyclically by starting the engine with the brake applied. If the brake "holds", this is detected from the fact that the component part does not move, this being detected by the machine controller or a separate monitoring device by means of the abovementioned glass scale or some other suitable sensor.

However, the breaking of the coupling and the breaking of the ball screw itself are problematic.

To counteract these faults, additional mechanical elements have previously been employed, these being arranged separately and being clamped when required, either through the operation of the machine controller or by hand, ensuring that the component part can no longer traverse on its guide rails or the spindle nut can no longer be moved along the ball screw.

There is also a known practice here of placing additional retention elements, e.g. a wooden beam, under the spindle head when maintenance work is being carried out.

However, all these measures are associated, on the one hand, with the problem that they may not be applied by the operating personnel when swift intervention is required, while, on the other hand, they then form complex safety elements when they are operated by the machine controller itself. In addition, there is the fact that these retention elements must also be checked in turn.

DE 79 26 126 U1 discloses a vertically mounted ball rolling spindle for driving a lift truck. If the load on the lift truck is relieved, the ball screw, which is supported at the bottom with a small amount of play, is raised by this amount. A disk connected to the lower end for conjoint rotation therewith is thereby pressed against a stop, and further rotation of the ball screw is thereby prevented. If the ball screw breaks, the lift truck may sink due to gravity.

DE 79 26 847 U1 describes the parallel arrangement of a plurality of positively coupled spindles. If one of these spindles breaks, the remaining spindles are capable of ensuring operation, at least temporarily. However, this structure is very complex.

DE 29 18 641 A describes a drive for a tool spindle slide in a machine tool, said slide comprising two ball screws connected mechanically in parallel, both of which are driven. The first ball screw is not self locking, while the second is of self locking design. If the drive goes out of operation, the second ball screw prevents unwanted rotation of the first ball screw. This structure is also of very complex design.

U.S. Pat. No. 5,581,220 A describes a lifting device having a vertical ball screw. Arranged in the region of the spindle bearing assembly is a braking device, which counteracts the rotation of the ball screw and thus allows heavy loads to be lowered. If the ball screw breaks, this brake is inoperative.

SUMMARY OF THE INVENTION

In view of the above, one object of the present invention to provide a machine of the type mentioned at the outset in which the possible impairment of machining accuracy and/or safety can be detected in a manner which is simple and reliable in terms of design, even before a machine part breaks or separates.

According to the invention, this object and other objects are achieved, in the case of the machine mentioned at the outset, by the fact that both stops are designed in such a way that, when the component part is in the end position, it is in contact with the frame part only via the first of the two stops, wherein the first stop preferably lies outside the movement path.

In a simple embodiment, the extent of both stops in the direction of the movement path is such that, when the component part is in the end position, it rests against the frame part only via the first stop.

The novel machine tool allows a simple test as to whether certain machine parts have lost their strength and/or stiffness to such an extent due to wear, material fatigue, material defects or the like that there is the possibility of accuracy problems in the operation of the machine and/or the occurrence of safety problems.

For this purpose, the component part is traversed into the end position by means of the drive unit, with the result that it rests against the first stop if the first stop is arranged on the frame part, or the first stop rests against the frame part if it is arranged on the component part. In the end position, therefore, the component part initially rests against the frame part via the first stop.

In the context of the present application, "end position" is taken to mean the position of the component part which it adopts when it is traversed to such an extent that it rests against the frame part via the first stop without any further force being exerted. This is therefore the position of the component part which it adopts when neither a safety nor an accuracy problem is present or could occur.

A force then continues to be exerted on the component part by means of the drive unit, pushing it in the direction of the frame part.

If the machine controller or a monitoring device, which can be provided separately or designed to be part of the machine controller, now registers an additional unwanted movement of the component part and/or in the drive unit, this indicates an existing or possibly imminent accuracy and/or safety problem.

In the context of the present invention, an "unwanted movement of the component part and/or in the drive unit" means that the force applied by the drive unit either causes the component part resting against the frame part via the first stop to be deformed, bent or twisted, this being allowed by the two stops designed in accordance with the invention, or causes the drive unit to perform an internal movement, that is to say, for example, the motor or the ball screw rotate by a small additional amount, or a machine part of the drive unit performs an additional movement.

Such deformation, bending, twisting and movement are not possible if all the machine parts affected by the application of force and the connections between them have the strength and/or stiffness required for correct and reliable operation of the machine, and are therefore "unwanted".

A breakage or separation of a coupling, shaft or connection between machine parts would also lead to such an unwanted "movement of the component part and/or in the drive unit".

If such an unwanted "movement of the component part and/or in the drive unit" is detected, there is either already an accuracy and/or safety problem, or it will occur with significant probability.

In such a case, a fault message is output, and the operating personnel can seek and eliminate the source of the fault.

Thus, the invention allows the testing of all components which are subjected to a load in a closed circuit comprising a drive unit, a component part, the guides thereof, a frame part and a machine frame, and can fail. In this case, not only is an already existing accuracy and/or safety problem detected but also even the possibility that such an accuracy and/or safety problem may occur if the machine continues to be operated.

In view of the above, the present invention also relates to a method for operating a machine, in particular a machine tool for machining workpieces, wherein the machine has a machine frame, at least one component part which can be moved along a movement path by means of a power-operated drive unit, at least one frame part, which is connected to the machine frame and which is arranged at an end position in the movement path of the component part, and at least a first stop, via which the component part is in contact with the frame part when said component part is in the end position, wherein a machine controller is designed to control the drive unit in such a way that a) the component part is traversed into the end position by means of the drive unit, where it rests against the frame part via the first stop, and b) a force continues to be exerted on the component part by means of the drive unit, pushing it in the direction of the frame part, and wherein the machine controller is furthermore designed to c) detect whether a further movement of the component part and/or in the drive unit takes place, and d) outputs a fault message if a movement is detected in step c).

The inventors of the present application have namely recognized that the method described above in respect of two stops, which are of different lengths for example, can also be implemented if there is only one stop between the frame part and the component part.

If this stop is situated centrally with respect to the movement path, as is customary in the prior art, no twisting or deformation of the component part may be caused by the method according to the invention, even if the component part has become intrinsically "soft", precisely because the central stop does not allow any further movement of the component part itself.

In the context of the present application, a stop situated "centrally with respect to the movement path" is taken to mean a position of the stop which is in the direction of the exertion of force, ensuring that the component part cannot bend, be deformed or twist around the stop or past the stop.

However, movements in the drive unit, that is to say, for example, twisting, deformation and bending or breakage or separation of a coupling or shaft, may nevertheless be caused and recognized as potential safety or accuracy problems.

In one embodiment, the first stop is situated outside the movement path, i.e. off-center, because an unwanted movement of the component part can then also be caused and detected.

In the context of the present application, a stop situated "outside the movement path" is taken to mean a position of the stop which is not in the direction of the exertion of force, such that that the component part can bend, be deformed or twist around the stop or past the stop if it is soft or flexible in relation to the force exerted by the drive unit.

In view of the above, the present invention also relates to a machine, in particular a machine tool for machining workpieces, wherein the machine has a machine frame, at least one component part which can be moved along a movement path by means of a power-operated drive unit, at least one frame part, which is connected to the machine frame and which is arranged at an end position in the movement path of the component part, and at least a first stop, via which the component part is in contact with the frame part when said component part is in the end position, wherein the first stop lies outside the movement path.

In the case of linear movement paths, three stops of equal length arranged in a manner distributed uniformly around the direction of the exertion of force would always prevent unwanted movement of the component part if they extended parallel to one another in the direction of the movement path, for example.

If two stops are provided in the case of a linear, i.e. straight line, movement path, then, according to the invention, they have a different length, which means that they extend parallel to one another in the direction of the movement path but have different lengths in absolute terms, with the result that, when the component part approaches the frame part, the component part initially comes into contact with the frame part only via the first stop.

If three or more stops are provided, provision is made according to the invention for one stop to be longer than all the others.

In the case of circular or curved movement paths or in the case of frame parts which extend obliquely with respect to the movement path, on the other hand, the important point is not the absolute length of the stops but that they are positioned in such a way and their length chosen such that, in this case too, when the component part approaches the frame part, the component part initially comes into contact with the frame part via the first stop.

Both in the case of linear and of circular or curved movement paths, there remains a certain gap between the second stop or the further stops and the component part—or the frame part—when the component part is in the end position, said gap allowing unwanted movement of the component part but retaining said part after a certain amount of deformation, twisting, bending or the like.

Thus, for one concept of the invention, only a stop arranged outside the movement path is required. If at least one second stop is provided, it enhances safety since, in the event of an unwanted movement of the component part, it is halted when the distance between the second stop and the component part or frame part has been crossed. Here, the distance is chosen so that the unwanted movement thereby allowed can be reliably detected.

By means of simple design measures and simple control measures, it is thus possible in the case of a machine of the type in question to detect whether an accuracy and/or safety problem already exists or may occur with a certain probability.

According to one embodiment, at least one stop is associated with the component part and/or the frame part, although it is also possible for both stops to be arranged on the component part or the frame part.

It is advantageous here that the stop or stops can be distributed in an appropriate manner between the component part and the frame part, depending on the structural circumstances, allowing a machine construction which is simple in terms of design.

As an alternative, it is preferred if at least one stop is arranged on a holder, which can be moved into the movement path between the component part and the frame part.

It is advantageous here that the frame part can optionally be moved into the movement path, thus enabling the end position to be provided at suitable positions along the movement path in a manner that is simple in terms of design. This allows a check as to whether unwanted movements are occurring without having to move the component part into the outermost position along the movement path. During the operation of the machine, it is possible in this way to insert an end position from time to time in order to test the machine for potential accuracy and/or safety problems without requiring as much unproductive time as would be the case if the outermost end position had to be adopted each time for this purpose.

If the location of the stops is known, the machine controller can move the component part immediately into the end position and then start the test for potential accuracy and/or safety problems. If the location of the stops and/or of the end positions is unknown, the machine controller initially moves the component part in creep mode in the direction of the assumed end position, the reaching of which is detected in a suitable manner by sensors.

In another embodiment, a sensor, preferably associated with the first stop, is provided, said sensor detecting whether the component part is in its end position, wherein the second stop is preferably associated with a sensor which detects a change in the distance between the frame part and the component part.

It is advantageous here that unwanted movements of the component part can be detected in a simple manner with the aid of two sensors without intervening in the machine controller.

It is further embodiment, the drive unit has a motor, preferably an electric or stepping motor, which is coupled to the component part in such a way that, when the motor rotates, the component part is traversed along the movement path, and wherein a monitoring device is provided, which detects the rotation of the motor and/or the movement of the component part, wherein the component part preferably performs a rotary movement along a circular movement path due to the rotation of the motor, and as a further preference, the drive unit has a ball screw, which is driven by the motor and on which a spindle nut is seated, which is connected to the component part in such a way that the component part follows a linear movement path along the ball screw when the ball screw is rotated by means of the motor.

These measures provide a machine tool in which checking whether there is an actual or potential accuracy or safety problem is particularly important.

It still another embodiment, the monitoring device detects the rotation of the ball screw, the axis of rotation of the ball screw is preferably aligned vertically and the component part is traversed vertically upward or downward and, as a further preference, the component part comprises a vertically aligned tool spindle having a spindle chuck for gripping a machining tool, wherein, as a further preference, the ball screw is arranged vertically below the motor.

These measures too provide a machine tool in which checking whether there is an actual or potential accuracy or safety problem is particularly important.

It is self-evident that the features mentioned above and those that will be explained below can be used not only in the respectively indicated combination but also in other combinations or in isolation without exceeding the scope of the present invention.

BRIEF DESCRIPTION OF THE DRAWINGS

Embodiments of the invention are shown in the drawing and are explained in greater detail in the following description. In the drawing.

DESCRIPTION OF A PREFERRED EMBODIMENT

Figure 1:
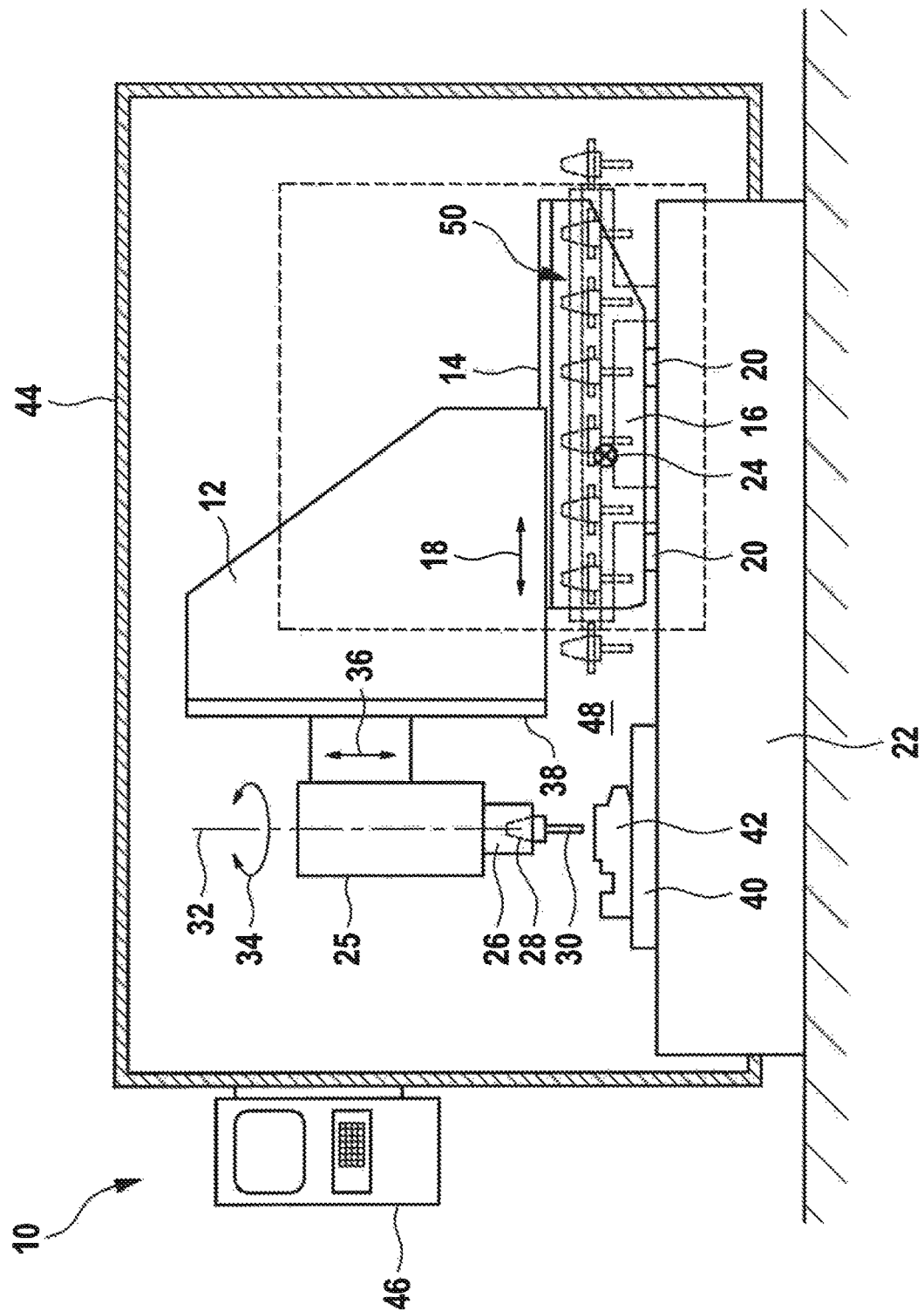
FIG. 1 shows a simplified illustration in a schematic side view of a machine tool on which the novel method can be carried out.

FIG. 1 illustrates, in a schematic side view that is not to scale, a machine tool denoted overall by reference numeral 10.

The machine tool 10 has a traveling column 12, which is arranged by a first slide guide 14 on a cross piece 16. The traveling column 12 can be traversed on the cross piece 16 with the aid of the first slide guide 14 in the direction of an axis which is usually referred to as the y axis and is here illustrated symbolically by an arrow 18. It is self-evident that the traveling column 12 is traversed by motor on the first slide guide 14, although a corresponding drive unit is not illustrated here for reasons of clarity.

The cross piece 16 is supported on a machine frame 22 via a second slide guide 20. The second slide guide 20 allows movement of the cross piece 16 along a second axis, which is here indicated by reference numeral 24. Reference numeral 24 denotes the so-called X axis. It is self-evident that the movement of the cross piece 16 on the second slide guide 20 is also accomplished with the aid of a suitable drive unit, which is not illustrated here for reasons of clarity.

A spindle head 25 having a tool spindle 26 mounted rotatably therein is mounted in a vertically suspended manner on the traveling column 12. At its lower end, the tool spindle 26 has a spindle chuck 28, into which a tool holder 29 having a machining tool 30 secured thereon can be clamped in a known manner. Typically, the tool holder is standardized and is of the steep taper (SK) or hollow shank taper (HSK) type. The tool spindle 26 is designed to rotate the machining tool 30 about its spindle axis 32, this being indicated by an arrow 34. Typically, the tool spindle 26 is capable of rotating the machining tool 30 at several thousand revolutions per minute in order, in particular, to allow drilling and milling of metal workpieces.

The tool spindle 26 can be traversed on the traveling column 12 in the direction of an arrow 36, in this case therefore in a vertical direction, by means of a drive unit (likewise not shown), which can be designed as a ball screw or linear direct drive. Accordingly, the tool spindle 26 is mounted on the traveling column 12 by means of a third slide guide 38. The movement of the tool spindle 26 in the direction of the arrow 36 is generally referred to as the Z axis. Typically, the three slide guides 14, 20 and 38 for the three motion axes 18, 24, 36 are orthogonal to one another.

The machine tool 10 is therefore a traveling column machine with a vertical tool spindle 26, on which all three motion axes 18, 24, 36 are implemented in the machining tool 30.

Reference 40 denotes a workpiece table, which is mounted on the machine frame and on which a workpiece 42 to be machined is clamped. Reference 44 denotes a housing, which encloses the components of the machine tool 10 which have been described thus far. Finally, reference 46 denotes a machine controller, with the aid of which all the movements of the machine tool 10 and auxiliary units (coolant supply, compressed air and the tool magazine described below) are controlled.

In this way, the machining tool 30 can be traversed in a workspace denoted by 48 in order to machine the workpiece 42 there.

During this machining, different machining tools 30 are employed, and these are held ready in a tool magazine 50 illustrated only very schematically in FIG. 1.

To change tools, the traveling column moves toward the rear in the y direction 18, that is to say to the right in FIG. 1. The tool spindle 26 is now above the tool magazine 50, in which an empty space is provided into which the tool spindle 26 then places the tool holder 29 with the machining tool 30 that has been used up to this point. The tool magazine 50 then traverses an occupied magazine space into the transfer position below the tool spindle 26, in which a tool holder 29 with a machining tool 30 now envisaged for use is situated. This type of tool change is referred to as a pickup process.

Figure 2:
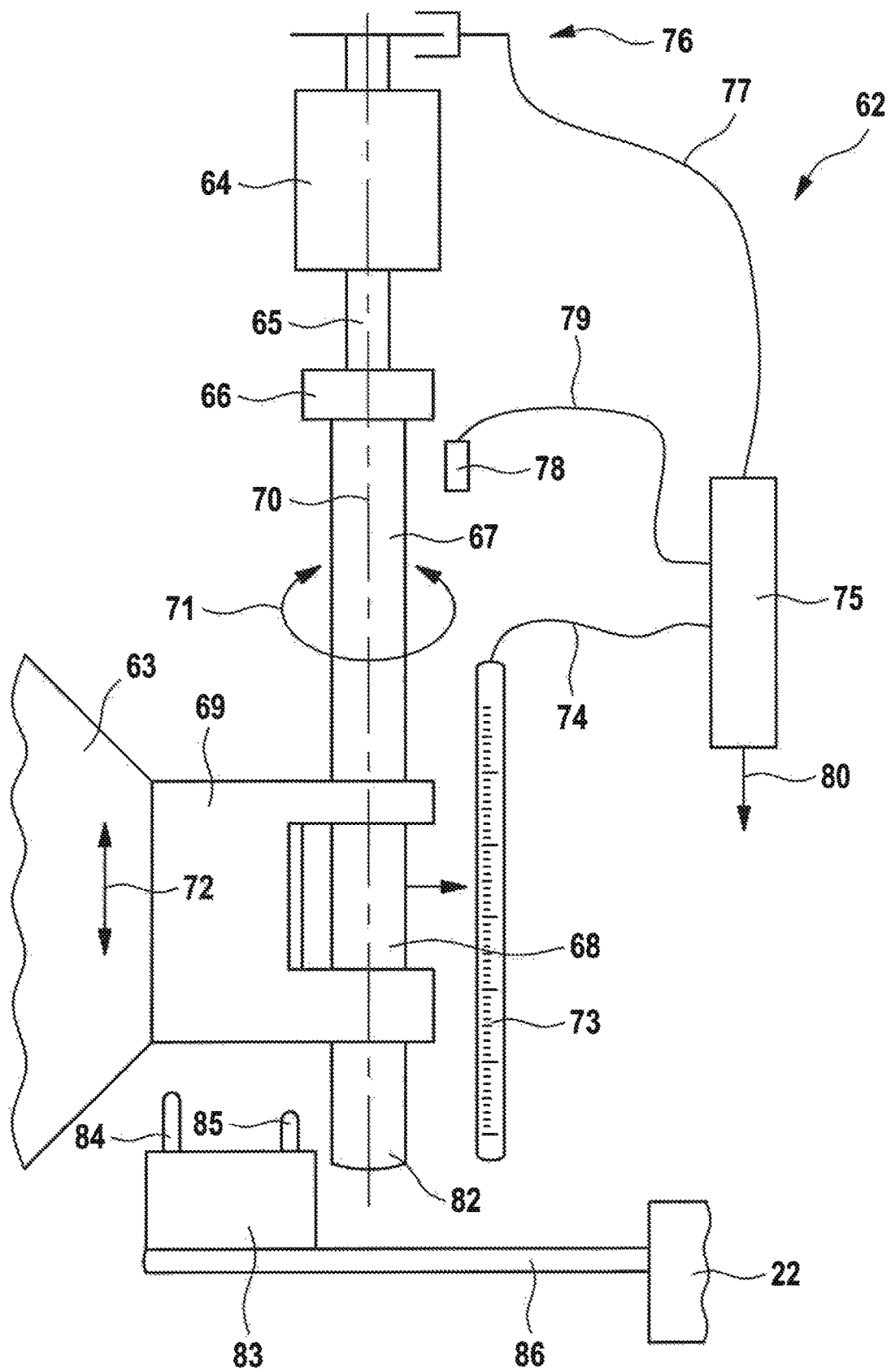
FIG. 2 shows a schematic illustration of a drive unit for a component part of the machine tool from FIG. 1, said component part following a linear movement path, the machine tool having two stops seated on a frame part between the component part and the frame part.

FIG. 2 shows a drive unit 62 for a component part 63 of the machine tool 10 from FIG. 1.

The component part 63 can be the spindle head 25, for example, and therefore the drive unit 62 is aligned vertically. However, it is also possible to use the drive unit 62 for the cross piece 16 or the traveling column 12, and then the drive unit 62 is aligned horizontally.

The drive unit 62 comprises a motor 64, which, in the example shown, is a stepping motor electrically supplied with and driven by control signals from the machine controller 46.

The motor 64 has a motor hub 65, which is connected by a torsionally rigid coupling 66 to a ball screw 67, which is situated vertically below the motor 64 and on which a spindle nut 68 is arranged.

The spindle nut 68 is connected to the component part 63 by means of a connecting part 69.

The ball screw 67 and the motor hub 65 are aligned coaxially with one another and have a vertically aligned axis of rotation 70, enabling the motor 64 to rotate the ball screw 67 clockwise and counterclockwise as per arrow 71 via the coupling 66.

During this rotation of the ball screw 67, the spindle nut 68 and thus the component part 63 are traversed along a linear movement path 72 in an upward direction, i.e. toward the motor 64 and hence counter to gravity, or in a downward direction and hence away from the motor 64 and thus in the direction of gravity.

Since the coupling 66 is torsionally rigid, the ball screw 67 follows the revolutions of the motor hub 65 without play. This gives rise to a movement of the spindle nut 68 determined by the pitch of the ball screw 67. The movements of the spindle nut 68 along the ball screw 67 are monitored with the aid of a sensor 73, which is here designed as an indicated glass scale. The sensor 73 is connected by a line 74 to a monitoring device 75, which can be part of the machine controller 46.

A sensor 76 detects the rotation of the motor hub 65 and hence the rotation of the motor 64. The sensor 76 is connected by a line 77 to the monitoring device 75.

A further sensor 78 detects the rotation of the ball screw 67. The sensor 78 is connected by a line 79 to the monitoring device 75.

From the signals of the sensors 73, 76, 78, the monitoring device 75 determines whether the rotation of the motor 64, the ball screw 67 and the component part 63 coincide, i.e. that the actual movement of the component part 63 along the movement path 72 coincides with the movement determined by the rotation of the motor 64 via the pitch of the ball screw 67.

If this is not the case, the coupling 66 or the ball screw 67 may be broken, for example. The monitoring device 75 then outputs a fault message 80.

Provided at the lower end 82 of the ball screw 67 is a frame part 83, which is connected to the machine frame 22 and on which a first stop 84 and a second stop 85 are arranged. The frame part 83 can be connected firmly to the machine frame 22 or arranged on a holder 86, which can be pivoted into the movement path 72 when required.

Figure 3:
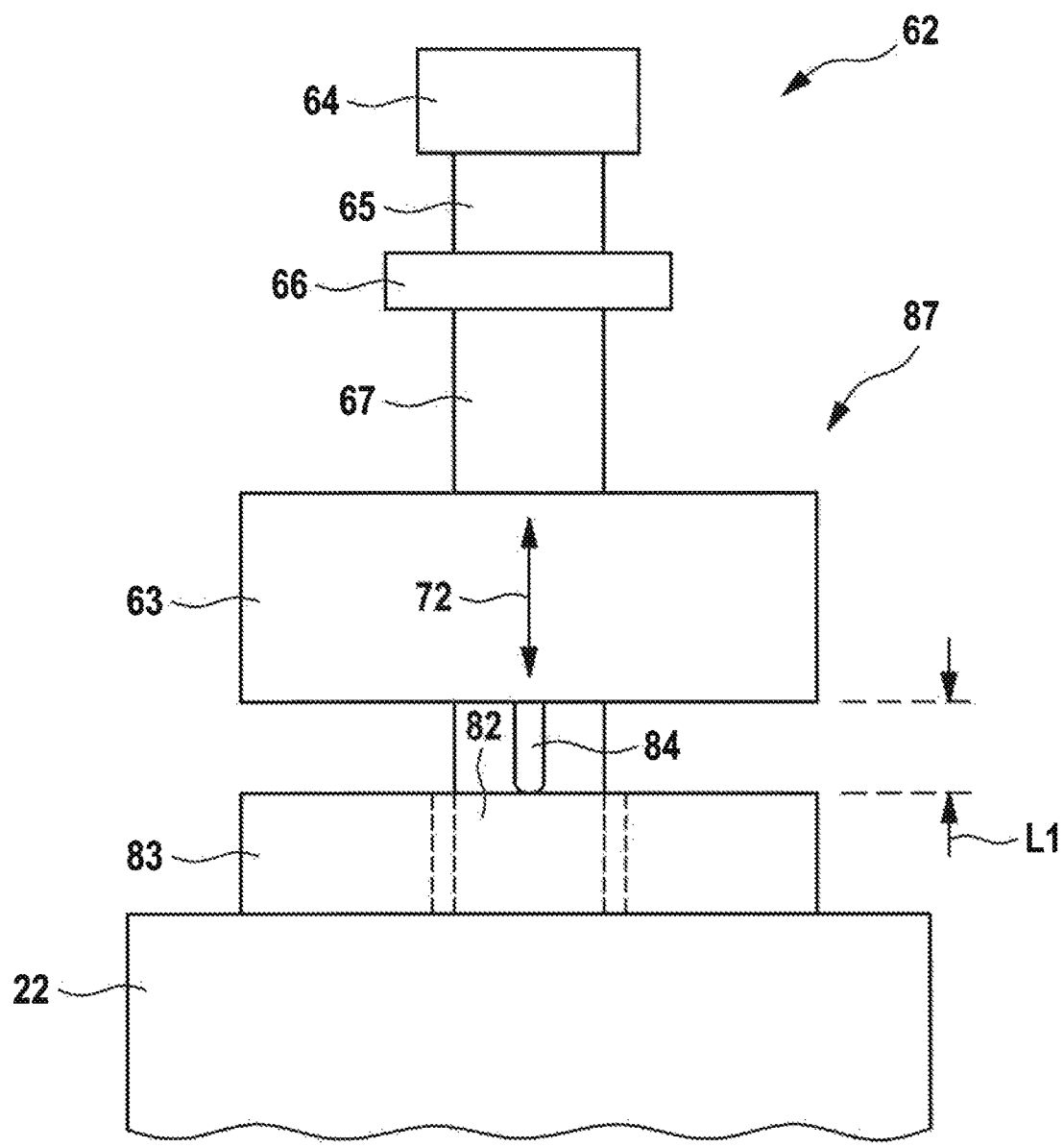
FIG. 3 shows an illustration like that in FIG. 2, wherein only one stop is provided, this being seated on the component part.

In this way, an end position for the movement of the component part 63 along the movement path 72 is defined, as illustrated schematically by means of FIG. 3, in which the component part 63 is in its end position.

The machine tool is just one example of a machine in which the invention can be employed. For example, the machine can be designed as a machine tool having a horizontal tool spindle or without a tool magazine or can be a handling machine, drilling machine, press or the like.

The only important point is that the machine 10 has a machine frame 22, a component part 63 which can be moved along a movement path 72 by means of a power-operated drive unit 62, a frame part 83, which is connected to the machine frame 22 and which is arranged at an end position in the movement path 72 of the component part 63, and a first stop 84, via which the component part 63 is in contact with the frame part 83 when said component part is in the end position and which, in one embodiment, lies outside the movement path 72, as shown in principle in FIG. 2.

FIG. 3 shows the component part 63 from FIG. 2 in its end position 87, in which the first stop 84, which is here arranged on the component part 63, rests against the frame part 83, with the result that the component part 63 is at a distance from the frame part 83 which corresponds to the length L1 of the first stop 84 in the direction of the movement path 72.

Here, as a departure from the illustrative embodiment in FIG. 2, the first stop 84 is not only arranged on the component part 63 but is also arranged there coaxially with the movement path 72. Here, the lower end 82 of the ball screw 67 is mounted in the frame part 83 connected to the machine frame 22.

In FIG. 3, the movement path 72 of the component part is shown as being coaxially in the ball screw 67, i.e. central with respect to the point of application at which the force that moves the component part along the movement path 72 is exerted on said part. Since the first stop 84 is situated centrally with respect to the movement path 72, the component part 63 cannot move further, i.e. cannot move around the stop 84 or bend, be deformed or twist past it, if it continued to be pressed onto the stop 84 by the drive unit 62.

If the motor 64 continues to be energized in the situation shown in FIG. 3, however, the motor hub 65, the coupling 66 and the ball screw 67 must withstand the force exerted on the component part 63 by the motor 64 via these machine parts since the component part cannot continue to move downward in FIG. 3. If one of these machine parts were to break, twist, be deformed or bend, this unwanted movement in the drive unit 62 would be detected by the sensors 73, 76, 78 shown in FIG. 2 and would be recognized as faults in the monitoring device 75, and a fault message 80 would be output.

When the component part 63 is in the end position 87, further exertion of force by the motor 64 thus allows a simple test as to whether machine parts of the drive unit 62 have lost their strength and/or stiffness to such an extent due to wear, material fatigue, material defects or the like that there is the possibility of accuracy problems in the operation of the machine and/or the occurrence of safety problems.

Figure 4:
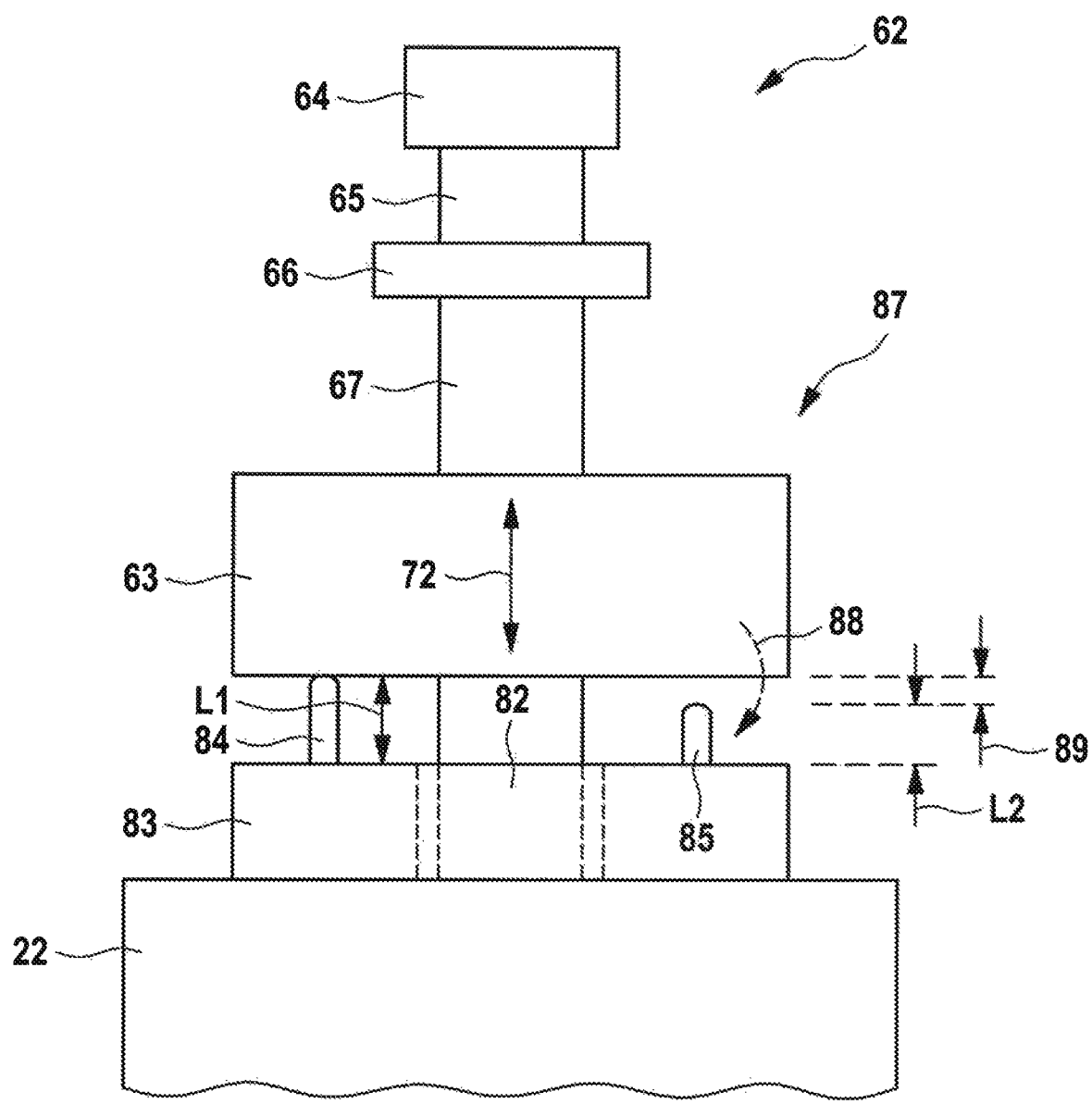
FIG. 4 shows an illustration like that in FIG. 2, wherein both stops are seated on the frame part.

When the stop 84 is situated outside the movement path 72, as is the case in FIG. 4, an unwanted movement of the component part 63 can additionally be caused and detected if the motor 64 continues to be energized. In FIG. 4, both stops 84, 85 are arranged on the frame part 83.

Because the stop 84 does not lie in the direction of the exertion of force, the component part 63 can bend, be deformed or twist around the stop 84 or past said stop if it is soft or flexible in relation to the force exerted by the drive unit 62.

This unwanted movement of the component part 63, which is indicated in FIG. 4 by a dashed arrow 88, can likewise be detected by the sensors 73, 76, 78 and can be detected in the monitoring device 75 as a fault, whereupon a fault message 80 is output.

As a safety precaution, the second stop 85 is provided, which is at a distance 89 from the component part 63 in the direction of the movement path 72 when the first stop 84 is already resting against the component part 63, with the result that the component part 63 can still bend by the distance 89 in the event of an unwanted movement before it is blocked by the second stop 85.

The first stop 84 once again has the length L1 in the direction of the movement path 72, while the second stop 85 has the length L2 in the direction of the movement path, said length L2 being less than length L1 by the distance 89.

In the embodiment in FIG. 4, the second stop 85 is likewise situated outside the movement path 72 but could also be arranged centrally.

Figure 5:
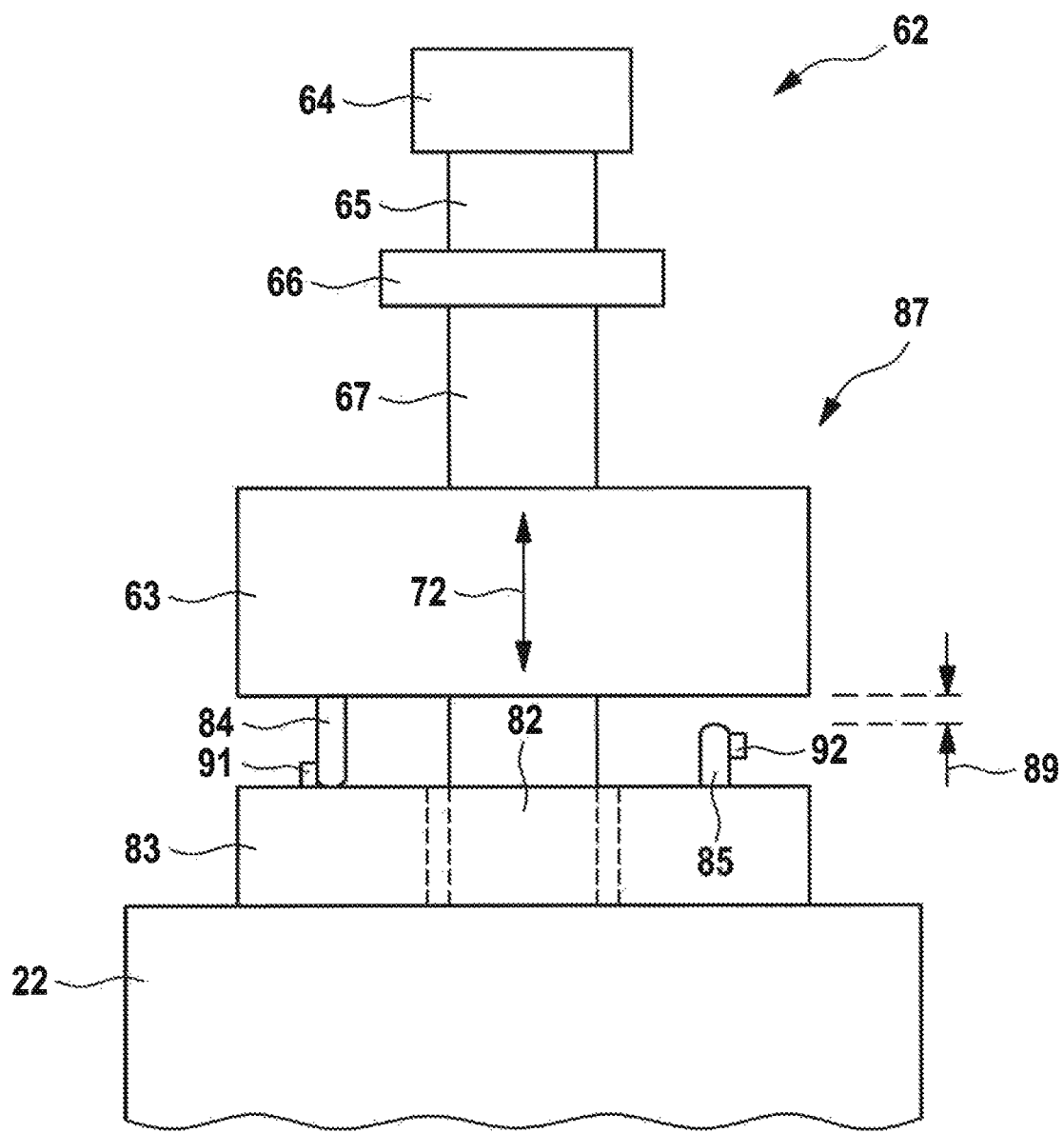
FIG. 5 shows an illustration like that in FIG. 2, wherein one stop is seated on the component part and one stop is seated on the frame part.

In order to further improve the detection of an unwanted movement or to provide an alternative possibility of detection, a sensor 91 which detects whether the component part 63 has reached its end position 87, i.e. is resting against the frame part 83 via the stop 84, is arranged on the first stop 84 according to the embodiment in FIG. 5. The sensor 91 can be a simple limit switch. It is connected to the monitoring device 75 by a line which is not illustrated.

Arranged on the second stop 85 is a sensor 92, which detects the distance 89 between the component part 63 and the stop 85 and the reduction in said distance in the event of an unwanted movement of the component part 63. The sensor 92 can be a simple distance sensor. It is connected to the monitoring device 75 by a line which is not illustrated.

In the embodiment in FIG. 5, the first stop 84 is arranged on the component part 63, and the second stop 85 is arranged on the frame part 83.

From the signals of the sensors 91, 92, the monitoring unit 75 detects when a component part 63 situated in an end position 87 continues to move, is deformed, bent or twisted etc. in an unwanted way and outputs the fault message 80.

Whereas both stops 84, 85 are arranged on the frame part 83 in the embodiment in FIG. 4, it is also possible for both to be provided on the component part 63.

In addition to the unwanted movement of the component part, the sensors 73, 76, 78 which are shown in FIG. 2 can also be used in the embodiments in FIGS. 4 and 5 to detect an unwanted movement in the drive unit 62, as has already been described above in connection with FIG. 3.

Figure 6:
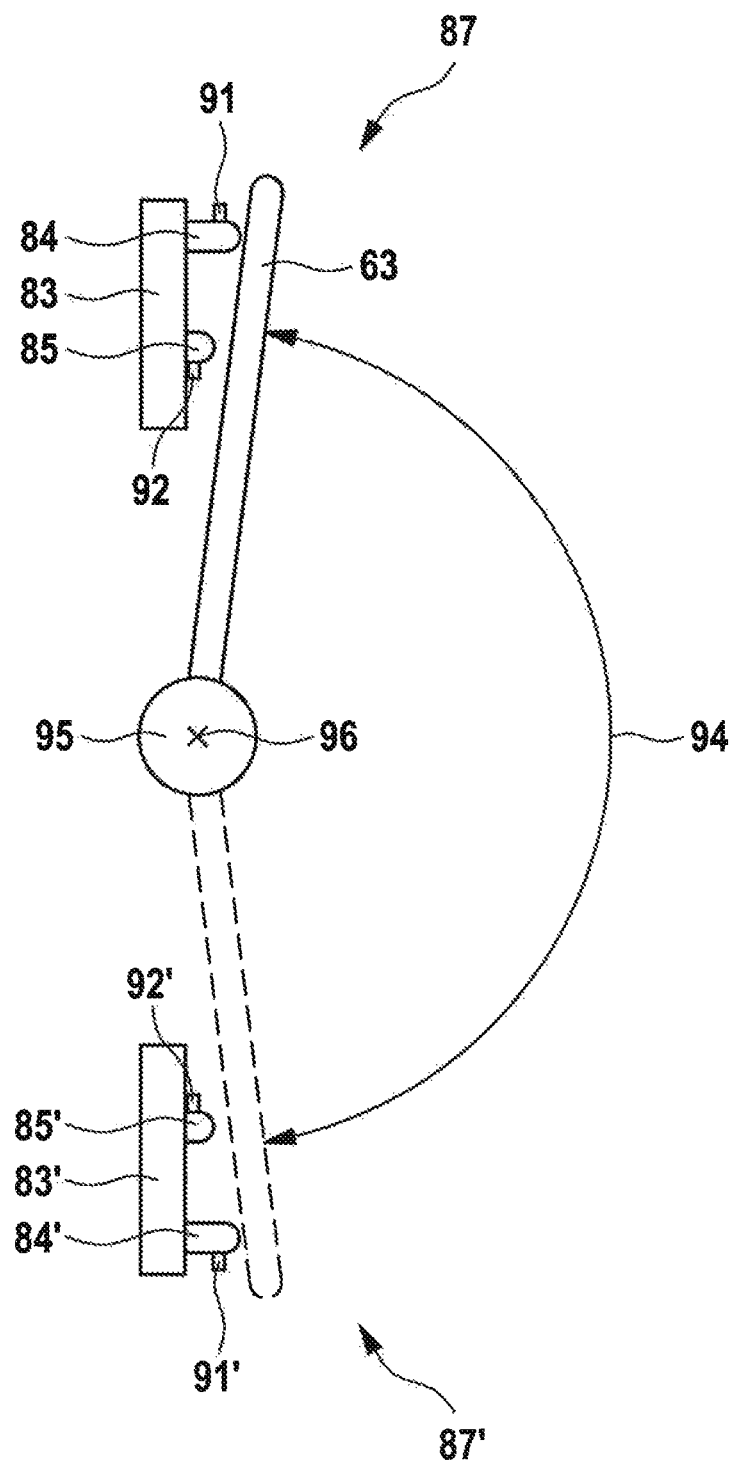
FIG. 6 shows an illustration similar to that in FIG. 2, wherein the component part follows a circular movement path.

Whereas the component part 13 in the embodiments in FIGS. 2 to 5 follows a linear movement path 72, it moves on a circular movement path 94 in the embodiment in FIG. 6.

The component part 63 is connected to a rotary drive 95, which moves it backward and forward along the movement path 94, around an axis of rotation 96, between two frame parts 83, 83', which define the end positions 87, 87'.

First and second stops 84, 85 and 84', 85', which face the component part 63, are arranged on the frame parts 83, 83'. Once again, the first stop 84, 84' has the length L1, and the second stop 85 has the length L2, with the result that the component part 13 rests against the frame part 83, 83' via the stop 84, 84' when it is in its end position 87, 87'.

Once again, the sensor 91, 91' is arranged on the first stop 84, 84', and the sensor 92, 92' is arranged on the second stop 85, 85'.

If, in order to test whether an accuracy or safety problem exists or could occur, the rotary drive 95 is activated in such a way that it continues to press the component part 63 against the frame part 83, 83' when said part is in the end position 87, 87', an unwanted movement of the component part 63 can be detected from the signals of the sensor 92, as in the embodiment in FIG. 5.

Therefore, what is claimed is:

1. A machining device, comprising
a machine frame,
a power-operated drive unit, the power operated drive unit configured to move at least one component part relative to said machine frame
along a movement path until the at least one component part rests against at least one frame part connected to said machine frame and arranged at an end position of movement of the at least one component part in the movement part via at least a first stop,
the power-operated drive unit further configured to exert a further force on the at least one component part to push the at least one component part while being in the end position towards the frame part,
wherein the first stop is situated between the at least one component part and the frame part, at least when the at least one component part is in the end position, wherein said first stop lies outside of the movement path, and
a controller that detects, after the at least one component part is in the end position, whether a movement of at least one of: the at least one component part and/or the drive unit takes place, and outputs a fault message if a movement of either is detected.

2. The machining device of claim 1, wherein the machining device is configured to perform one or more machining operations on the one or more component parts.

3. The machining device of claim 1, wherein at least a second stop is provided, said first and at least second stops are designed and arranged in such a way that, when the at least one component part is in the end position, said at least one component part is in contact with the frame part only via a first of said two stops.

4. The machining device of claim 1, wherein said first stop is arranged on the at least one component part.

5. The machining device of claim 1, wherein said first stop is arranged on the frame part.

6. The machining device of claim 1, wherein a holder is provided, which holder is arranged such as to be moved into the movement path between the at least one component part and the frame part, said first stop being arranged on said holder.

7. The machining device of claim 1, wherein a first sensor is provided, said first sensor arranged for detecting whether said at least one component part is in its end position.

8. The machining device of claim 7, wherein said first sensor is associated with said first stop.

9. The machining device of claim 7, wherein a second sensor is provided, said second sensor arranged for detecting a change in a spacing between the frame part and the at least one component part when said at least one component part is in its end position.

10. The machining device of claim 9, wherein at least a second stop is provided, said first and at least second stops are designed and arranged in such a way that, when the at least one component part is in the end position, said at least one component part is in contact with the frame part only via a first of said two stops, and wherein said second sensor is associated with said second stop.

11. The machining device of claim 1, wherein said drive unit comprises a motor, which motor is coupled to the at least one component part in such a way that, when said motor rotates, said component part is traversed along the movement path, and wherein a monitoring device is provided, which monitoring device detects at least one of said rotation of said motor and said movement of said at least one component part.

12. The machining device of claim 11, wherein said at least one component part performs a rotary movement along a circular movement path due to the rotation of the motor.

13. The machining device of claim 11, wherein said drive unit comprises a ball screw driven by said motor, on which ball screw a spindle nut is seated, which spindle nut is connected to said at least one component part in such a way that said at least one component part follows a linear movement path along the ball screw when the ball screw is rotated by means of the motor.

14. The machining device of claim 13, wherein the monitoring device detects said rotation of said ball screw.

15. The machining device of claim 13, wherein an axis of rotation of said ball screw is aligned vertically and said component part is moved vertically upward or downward.

16. The machining device of claim 15, wherein said ball screw is arranged vertically below said motor.

17. The machining device of claim 1, wherein said at least one component part comprises a vertically aligned tool spindle having a spindle chuck for gripping a machining tool.

18. A method for operating a machine, said machine comprising a machine frame, a power-operated drive unit, at least one component part moved by said power-operated drive unit relative to said machine frame along a movement path, at least one frame part connected to said machine frame and arranged at an end position of movement of said component part in the movement path, and at least a first stop, said first stop being situated between the component part and the frame part, at least when the component part is in the end position, said method comprising the steps of
a) moving said component part into said end position by means of said drive unit, until said component part rests against said frame part via said first stop,
b) exerting a further force on said component part by means of said drive unit, thereby pushing said component part while being in the end position towards the frame part,
c) detecting whether a further movement of at least one of the component part and in the drive unit takes place, and
d) outputting a fault message if a movement is detected in step c).

19. The method of claim 18, wherein said first stop lies outside of the movement path.

20. The method of claim 18, wherein said first stop lies centrally to the movement path.

21. The method of claim 18, wherein said machine is embodied as a machine tool for machining workpieces.

22. The method of claim 18, wherein at least a second stop is provided, said first and at least second stops are designed and arranged in such a way that, when the component part is in the end position, said component part is in contact with the frame part only via a first of said two stops.

23. The method of claim 18, wherein a holder is provided, said first stop being arranged on said holder, said holder being moved into the movement path between the component part and the frame part prior to step a).

24. The method of claim 18, wherein a first sensor is provided, said first sensor detecting in step a) whether said component part is in its end position.

25. The method of claim 18, wherein a second sensor is provided, said second sensor detecting in step c) a change in a spacing between the frame part and the component part.

26. The method of claim 18, wherein said drive unit comprises a motor, which motor is coupled to the component part in such a way that, when said motor rotates, said component part is traversed along the movement path, and wherein a monitoring device is provided, which monitoring device detects in step c) at least one of said rotation of said motor and said movement of said component part.

27. The method of claim 26, wherein said drive unit comprises a ball screw driven by said motor, on which ball screw a spindle nut is seated, which spindle nut is connected to said component part in such a way that said component part follows a linear movement path along the ball screw when the ball screw is rotated by means of the motor, wherein in step c) said the monitoring device detects said rotation of said ball screw.

\* \* \* \* \*